United States Patent [19]

Fujino et al.

[11] Patent Number: 5,030,983
[45] Date of Patent: Jul. 9, 1991

[54] AUTOFOCUS CAMERA

[75] Inventors: Akihiko Fujino; Kenji Ishibashi; Reiji Seki; Sadanobu Ueda, all of Osaka, Japan

[73] Assignee: Minolta Camera Kabushiki Kaisha, Osaka, Japan

[21] Appl. No.: 527,146

[22] Filed: May 23, 1990

[30] Foreign Application Priority Data

May 24, 1989 [JP] Japan .................................. 1-130744

[51] Int. Cl.$^5$ ....................... G03B 13/36; G03B 19/12; G03B 9/02
[52] U.S. Cl. .................... 354/400; 354/152; 354/270
[58] Field of Search ............... 354/400, 402, 412, 446, 354/152, 270, 271.1

[56] References Cited

U.S. PATENT DOCUMENTS

| 4,783,677 | 11/1988 | Hamada et al. | 354/402 |
| 4,841,327 | 6/1989 | Yamamoto et al. | 354/412 |
| 4,881,097 | 11/1989 | Ishiguro | 354/402 |
| 4,887,117 | 12/1989 | Kobayashi | 354/400 |
| 4,914,465 | 4/1990 | Saegusa et al. | 354/412 |
| 4,941,010 | 7/1990 | Aihara et al. | 354/152 X |
| 4,972,221 | 11/1990 | Ohnuki et al. | 354/402 |

Primary Examiner—W. B. Perkey
Attorney, Agent, or Firm—Burns, Doane, Swecker & Mathis

[57] ABSTRACT

An autofocus camera comprises a focus detector for detecting a deviation of a photographic lens from an in-focus position with respect to a photographic object, a mirror driver for moving a mirror for reflecting a light beam from the photographic object to a viewfinder optical system, into and out of an image-forming optical path, a lens driver for moving the photographic lens to the in-focus position in accordance with the deviation detected by the focus detector, and an aperture controller for stopping down the light beam from the photographic object. The lens driver has a function for moving the photographic lens, and the aperture controller a function for making aperture adjustment, both during retraction of the mirror. During retraction of the mirror, the aperture adjustment is effected before the lens movement or vice versa.

5 Claims, 3 Drawing Sheets

# AUTOFOCUS CAMERA

TECHNICAL FIELD

The present invention relates to an autofocus camera of the single lens reflex type.

BACKGROUND OF THE INVENTION

In order to effect autofocusing for excellent followability with respect to a moving photographic object, a well-known autofocus, single lens reflex camera comprises:

a focus detector for detecting a deviation of a photographic lens from an in-focus position with respect to a photographic object;

a mirror driver for moving a mirror for reflecting a light beam from the photographic object to a viewfinder optical system, into and out of an image-forming optical path extending from the photographic lens to a film;

a lens driver for moving the photographic lens to the in-focus position in accordance with the deviation detected by the focus detector, the lens driver having a function for moving the photographic lens during retraction of the mirror by the mirror driver; and an aperture controller for stopping down the light beam from the photographic object, the aperture controller having a function for aperture adjustment during retraction of the mirror by the mirror driver.

In this type of camera, the aperture adjustment by the aperture controller and the lens movement by the lens driver are carried out simultaneously during retraction of the mirror by the mirror driver.

The aperture controller includes an encoder for detecting the number of rotations of a motor for driving aperture blades, while the lens driver includes an encoder for detecting the number of rotations of a motor for driving the lens. The numbers of pulses output from the two encoders are counted for controlling the aperture adjustment by the aperture controller and the lens movement by the lens driver to be made by predetermined amounts, respectively.

With the structure of the above, it is impossible, because of a limitation to program processing time, to input the pulses from the two encoders to a microcomputer which controls a photo-taking operation of the camera, and count the numbers of pulses simultaneously. Therefore, a high-speed, high-performance, i.e. costly microcomputer should be used to perform such simultaneous count. Either number of pulses could be miscounted which impairs a precise aperture adjustment or movement of the photographic lens to an in-focus position. Thus, conventionally, the load of the microcomputer is mitigated by providing a separate counter circuit for counting the number of pulses output from the encoder included in the aperture controller, and outputting a counting completion signal to the microcomputer after a predetermined number of pulses has been counted. The pulses from the encoder of the lens driver are directly input to the microcomputer for counting its number.

However, in the conventional camera noted above, the microcomputer may not be able to count the pulses output from the encoder of the lens driver, because of the limitation to the program processing time, while an interrupt process for suspending the aperture adjusting operation by the aperture controller is prosecuted as the counting completion signal is input from the counter circuit. This results in an error in the lens movement for the number of rotations of the lens driving motor corresponding to the number of pulses input during such period. Consequently, the camera has the disadvantage of providing ill-focused photographs although it has an autofocusing function with good followability to a moving photographic object.

While the need for the separate counter circuit is a disadvantage, it is difficult for the counter circuit to absorb chattering which would be easy where a program of the microcomputer is used. This requires an additional, chattering absorption circuit or an optical system composed of expensive parts such as a pulse disk and a photo-interrupter instead of a mechanical contact type encoder included in the aperture controller.

SUMMARY OF THE INVENTION

An object of the present invention is to overcome the disadvantages of the prior art noted above and to provide a camera enabling a cost-friendly CPU to be used for effecting an autofocusing and aperture adjustments with high precision and with excellent followability with respect to a moving object.

The above object is fulfilled, according to the present invention, by an autofocus camera in which one of the aperture adjustment by the aperture controller and the lens movement by the lens driver is allowed after the other is completed during retraction of the mirror by the mirror driver, noting that it takes a relatively long time for retraction of the mirror while taking a relatively short time for the aperture adjustment and for driving the lens when adjacent the in-focus position.

While the mirror is retracted by the mirror driver, one of the aperture controller and the lens driver is allowed to carry out its function after the other. This enables the pulses from the encoder of the aperture controller and from the encoder of the lens driver to be directly input to the microcomputer and accurately counted with staggered timing. Thus, both the aperture adjustment and lens movement may be effected with high precision.

When the aperture adjustment is carried out first, for example, the pulses output from the encoder of the aperture controller with commencement of an aperture adjusting operation are counted, and the aperture adjusting operation is stopped when the pulse count reaches a predetermined count. Subsequently, e.g., after the lapse of time required for obtaining a minimum aperture size from the start of the aperture adjustment, the pulses output from the encoder of the lens driver with commencement of a lens moving operation (for autofocusing) are counted, and the lens moving is stopped when the pulse count reaches a predetermined count.

During retraction of the mirror, the lens movement (for autofocusing) may be allowed immediately upon actual completion of the aperture adjustment. This is preferable in avoiding an extended time taken before exposure since it is highly likely that the lens movement has been completed by the time the mirror retraction is completed. If the lens movement were effected after waiting for lapse of a set period necessary for stopping down the aperture diaphragm to a minimum aperture size, the lens movement over a long distance might not be completed by the time the mirror retraction is completed.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENT

Figure 1:
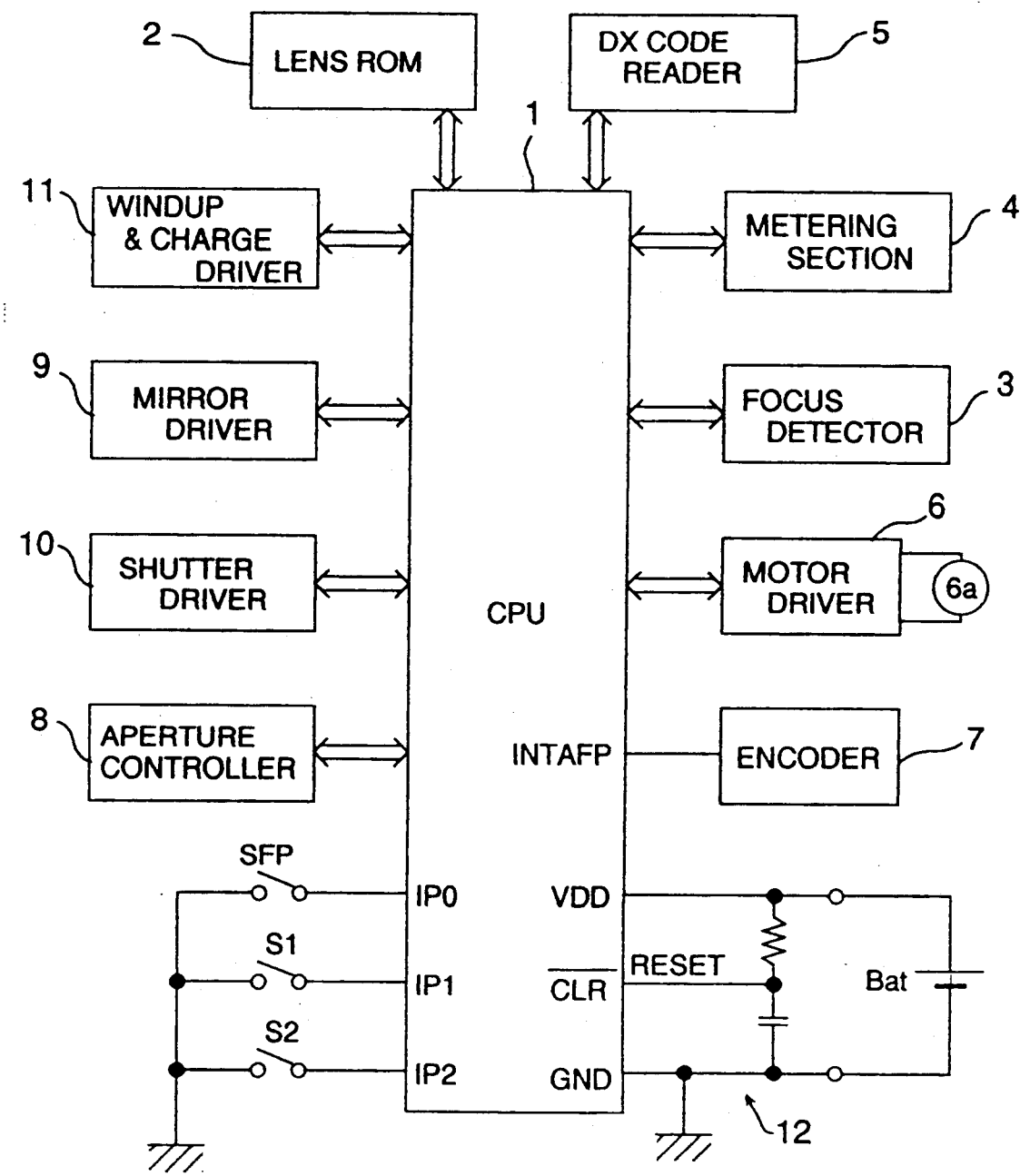
FIG. 1 is a block diagram of a control circuit incorporated into an autofocus camera according to the present invention.

FIG. 1 is a block diagram of an autofocus camera control circuitry. This circuitry includes a microcomputer 1 (hereinafter referred to as CPU) for carrying out an overall sequence control of the camera and arithmetic operations for exposure and focus detecting controls. The CPU 1 is connected through respective signal lines to function blocks 2–11, through a reset circuit 12 to a battery, and to a metering/focus detection starting switch S1, a release switch S2 and an encoder switch SFP for detecting aperture conditions.

Lens ROM circuit 2 is provided in a photographic lens removably attached to a camera body for communicating information relating to the lens such as the open F-value and focal length to the camera body.

Focus detector 3 is a circuit for receiving information from a focus detecting optical system (not shown) concerning an image formed by light having passed through an objective lens, and converting this information into an electric signal. Based on the input from this circuit, The CPU 1 calculates a deviation of the objective lens from an in-focus position with respect to a photographic object.

Metering section 4 is a circuit for detecting a luminance level of the Photographic object by metering the light having passed the objective lens. The metering circuit 4 outputs to the CPU 1 an APEX-type signal BVO corresponding to the luminance level of the photographic object.

DX code reader S is a circuit for reading film sensitivity, and outputting to the CPU 1 an APEX-type digital signal SV corresponding to the film sensitivity.

Motor driver 6 is a circuit for driving a lens motor 6a to move the photographic lens to the in-focus position with respect to an object for focus adjustment. The motor driver 6 starts the lens motor 6a in response to a signal received from the CPU 1 which is based on the deviation provided by the focus detecting means, and stops the motor 6a in response to a signal received from the CPU 1 which is based on a signal input from an encoder 7 described hereunder.

The encoder 7 detects an amount of rotation of the lens motor 6a, and transmits an output of a photo-interrupter, which generates a pulse signal corresponding to a predetermined rotational rate, to an interrupt terminal INT AFP of the CPU 1.

Aperture controller 8 is a circuit for controlling a motor (not shown) which drives aperture blades provided in the photographic lens. In response to a signal from the CPU 1 based on a signal input from the encoder switch SFP for detecting a stop-down amount, the aperture controller 8 drives the blades, which are opened for a metering operation by the metering section 4, to stop down to a desired degree for photo-taking.

Mirror driver 9 drives a mirror for reflecting a light beam from an object to a viewfinder optical system, into and out of an image-forming optical path extending from the photographic lens to a film.

Shutter driver 10 is a circuit for driving a shutter to expose the film after the mirror is retracted by the mirror driver 9.

Windup and charge driver 11 is operable to wind up the film and charge the aperture controller 8, mirror driver 9 and shutter driver 10 after the film is exposed by shutter driver 10.

Next, a camera operating sequence will be described with reference to the flowcharts shown in FIGS. 2 and 3.

Figure 2:
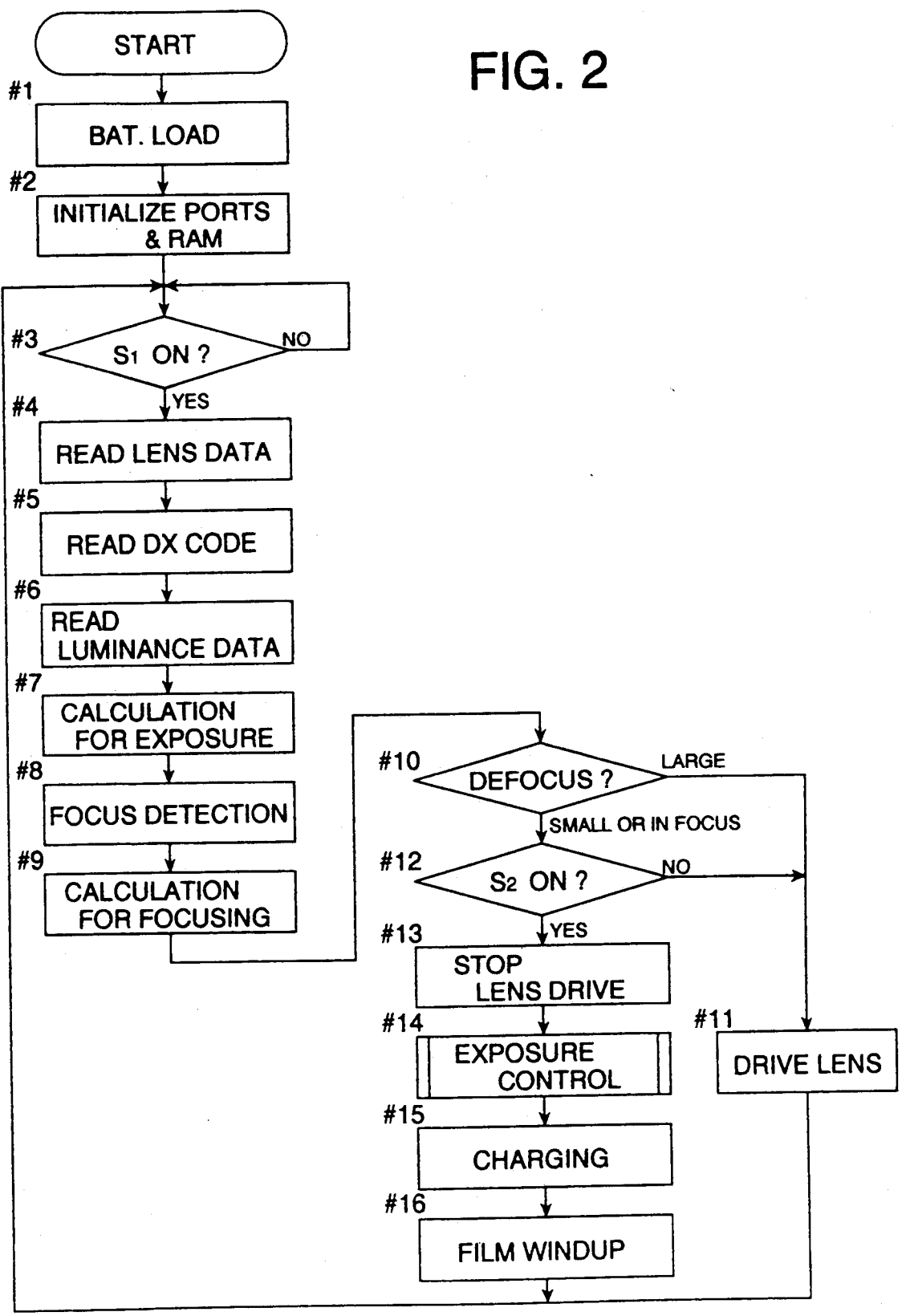
FIGS. 2 and 3 are flowcharts illustrating operation of the camera.
Figure 3:
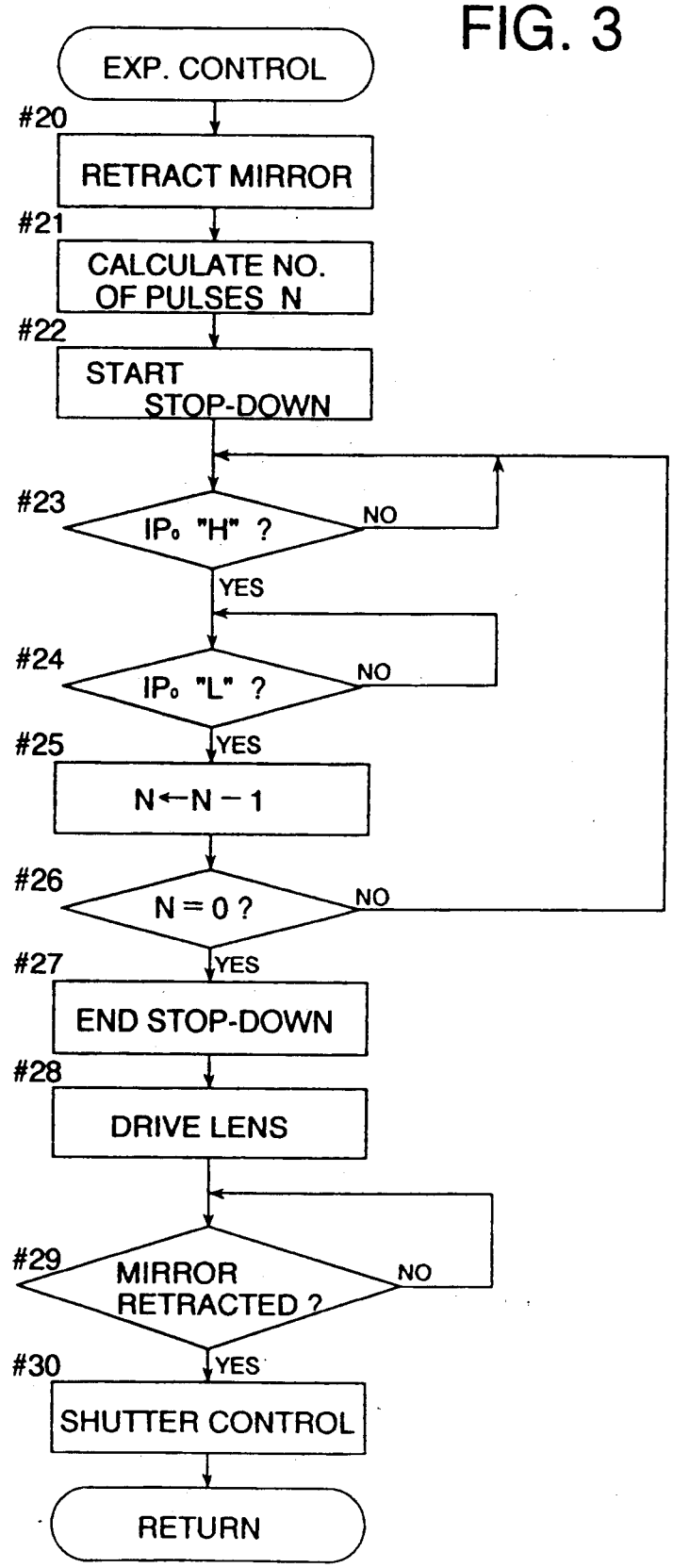

FIG. 2 shows a main routine which starts with loading of the battery which rests CPU 1 (step #1).

Various conditions within CPU 1 are set, and output ports and a RAM are initialized first (step #2).

Next, the metering/focus detection start switch S1 is checked. If this switch is off, the program stands by. If on, the program moves to the next step for carrying out a metering/focus detecting operation (step #3).

The information concerning the photographic lens attached to the camera is first read from the lens ROM circuit 2 (step #4).

Then the code showing the film sensitivity (DX code) is read from the DX code reader 5, and the code read is converted into ISO data (step #5).

CPU 1 receives luminance information of an object from the metering section 4 (step #6), and calculates a stop-down value and a shutter speed, i.e. carries out a calculation for automatic exposure (step #7).

Subsequently, CPU 1 receives image information in the form of electric signal from the focus detector 3 (step #8), and calculates a deviation from an in-focus position of the photographic lens (amount of defocus) with respect to the object, and an amount of lens movement based thereon, i.e. carries out a calculation for autofocusing (step #9).

Checking is made to find out whether the amount of defocus obtained from the calculation of step #9 is greater than a predetermined amount (a value showing a range adjacent the in-focus position) (step #10). If the amount of defocus is greater, the lens motor 6a is driven to move the photographic lens toward the in-focus position by the amount derived from the calculation (step #11). Thereafter the program returns to step #3. More particularly, at step #11, the number of rotations is counted by interrupt processing initiated by an interrupt signal INT AFP based on the pulse signal generated by the encoder 7 as the lens motor 6a is rotated by the motor driver 6, and the lens motor 6a is stopped when the number of rotations reaches the value derived from the above calculation.

If step #10 finds the amount of defocus derived from the autofocusing operation to be equal to or less than the predetermined amount, the release switch S2 is checked (step #12). If the release switch S2 is off, the program moves to step #11. Otherwise, the program moves to steps for carrying out a release operation.

In the release operation, if the lens motor 6a is in rotation at step #11, the motor 6a is stopped (step #13), and an exposure control subroutine as described later is called (step #14). After the exposure control, the aperture controller 8, mirror driver 9 and shutter driver 10 are charged by the windup and charge driver 11 (step #15). After a film windup operation (step #16), the program returns to step #3 to be ready for a next photo-taking operation.

The exposure control subroutine will be described next with reference to FIG. 3.

First, the mirror driver 9 is operated to start retracting the mirror from the image-forming optical path extending from the photographic lens to the film (step #20).

CPU 1 calculates an amount of adjustment of the aperture blades driven by the aperture controller 8 based on the stop-down value derived from the calculation of step #7, i.e. calculates the number of pulses N for stop-down to be counted by using the encoder switch SFP which are generated with rotation of a motor (not shown) for driving the aperture blades provided in the photographic lens (step #21), and then the motor is started (step #22).

At steps #23 through #26, the state of an input port IPO connected to the encoder switch SFP, and the number of pulses is counted. More particularly, the number of pulses N for stop-down is decremented each time the input port IPO changes from "H" to "L" (i.e. the edge of a pulse fall is detected). Steps #23 through #26 are repeated until the number N becomes zero, i.e. until the amount of adjustment of the aperture blades agrees with the stop-down value derived from the above calculation.

When the number N becomes zero, the motor for driving the aperture blades provided in the photographic lens is stopped, to complete the aperture adjustment by the aperture controller (step #27).

Thereafter, the lens motor 6a is driven by the necessary amount established by the calculation. This necessary amount can be corresponded to the amount of defocus derived by movement of the subject from step #9 to step #27, and also corresponded to the amount of defocus determined as a small amount at step #10 (step #28). That is, as at step #11, the number of rotations is counted by the interrupt processing initiated by the interrupt signal INT AFP based on the pulse signal generated by the encoder 7 as the lens motor 6a is rotated by the motor driver 6. The lens motor 6a is stopped when the number of rotations reaches the value derived from the calculation, to complete the lens movement by the lens driver.

Further, the program waits for completion of the mirror retraction started at step #20 (step #29). The shutter is driven by the shutter driver 10 to expose the film (step #30), to complete this subroutine.

Different embodiments will be described hereunder.

(1) In the described embodiment, while the mirror is retracted by the mirror driver, the lens is moved by the lens driver after the aperture adjustment made by the aperture controller. However, the aperture adjustment may be made after the lens movement effected by the lens driver.

(2) In the described embodiment, the aperture controller has a mechanical contact type encoder. Instead, an encoder comprising a pulse disk and a photo-interrupter may be employed for improved reliability with respect to noise. In this case, a counter circuit may be used to count the pulses, and this counter circuit may also count the pulses of the encoder provided for the lens driver, thereby to mitigate the load of the CPU.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An autofocus camera comprising: focus detecting means for detecting a deviation of a photographic lens from an in-focus position with respect to a photographic object;
   mirror drive means for moving a mirror for reflecting a light beam from the photographic object to a viewfinder optical system, into and out of an image-forming optical path extending from said photographic lens to a film;
   lens drive means for moving said photographic lens to said in-focus position in accordance with the deviation detected by said focus detecting means, said lens drive means having a function for moving said photographic lens during retraction of said mirror by said mirror drive means; and
   aperture control means for stopping down the light beam from the photographic object, said aperture control means having a function for aperture adjustment during retraction of said mirror by said mirror drive means;
   wherein one of the aperture adjustment by said aperture control means and the lens movement by said lens drive means is allowed after the other is completed during retraction of said mirror by said mirror drive means.

2. A camera as claimed in claim 1, wherein the lens movement by said lens drive means is allowed after completion of the aperture adjustment by said aperture control means during retraction of said mirror by said mirror drive means.

3. A camera as claimed in claim 2, wherein the lens movement by said lens drive means is allowed immediately upon completion of the aperture adjustment by said aperture control means during retraction of said mirror by said mirror drive means.

4. A camera as claimed in claim 1 wherein the aperture adjustment by said aperture control means is allowed after completion of the lens movement by said lens drive means during retraction of said mirror by said mirror drive means.

5. A camera as claimed in claim 4, wherein the aperture adjustment by said aperture control means is allowed immediately upon completion of the lens movement by said lens drive means during retraction of said mirror by said mirror drive means.

* * * * *